(12) United States Patent
Barnay et al.

(10) Patent No.: US 8,712,734 B2
(45) Date of Patent: Apr. 29, 2014

(54) METHOD FOR INSTALLING INDUSTRIAL COMPONENTS IN AN ENVIRONMENT

(75) Inventors: Jean-Jacques Barnay, Chatenoy le Royal (FR); Florent Bonicel, Sevrey (FR)

(73) Assignee: Areva NP, Courbevoie (FR)

( * ) Notice: Subject to any disclaimer, the term of this patent is extended or adjusted under 35 U.S.C. 154(b) by 817 days.

(21) Appl. No.: 12/922,394

(22) PCT Filed: Mar. 4, 2009

(86) PCT No.: PCT/FR2009/050351
§ 371 (c)(1),
(2), (4) Date: Sep. 13, 2010

(87) PCT Pub. No.: WO2009/115731
PCT Pub. Date: Sep. 24, 2009

(65) Prior Publication Data
US 2011/0040530 A1    Feb. 17, 2011

(30) Foreign Application Priority Data

Mar. 13, 2008    (FR) ...................................... 08 51636

(51) Int. Cl.
*G06F 17/50*    (2006.01)
(52) U.S. Cl.
USPC ............................................................. 703/1
(58) Field of Classification Search
CPC ........................... G06F 17/50; G06F 17/5086
USPC ......... 703/1; 700/61, 95, 97, 98, 182; 702/94, 702/95
See application file for complete search history.

(56) References Cited

U.S. PATENT DOCUMENTS

| 5,023,800 A | * | 6/1991 | Carver et al. ................... 700/182 |
| 5,721,677 A | * | 2/1998 | Pryor ............................... 700/61 |
| 2005/0172470 A1 | | 8/2005 | Cobb et al. |

OTHER PUBLICATIONS

International Search Report for PCT/FR2009/050351.

* cited by examiner

*Primary Examiner* — Kamini S Shah
*Assistant Examiner* — Luke Osborne
(74) *Attorney, Agent, or Firm* — Davidson, Davidson & Kappel, LLC

(57) ABSTRACT

A method for installing industrial components in an environment is provided, in which, with the aid of a computer-assisted design model representing the theoretical layout of the industrial components in the environment, various measuring points of the theoretical positioning of the supports of each component are determined, those theoretical measuring points are codified with values, parameterisable model measuring ranges are parameterized by the codified values, and at least one measuring device is controlled with the aid of the codified values by application of the corresponding range in order to compare the actual positioning points in the environment as a function of theoretical positioning points of the supports of each component. The method is applicable to the installation of the components of the loops of the primary circuits of nuclear power stations.

7 Claims, 6 Drawing Sheets

METHOD FOR INSTALLING INDUSTRIAL COMPONENTS IN AN ENVIRONMENT

Priority is claimed to French Patent Application FR 08 51636, filed Mar. 13, 2008 through international application PCT/FR2009/050351, filed Mar. 4, 2009, the entire disclosures of which are hereby incorporated by reference herein.

The present invention relates to a method for installing industrial components in an environment, such as, for example, the components of the loops of a primary circuit of a nuclear power station.

BACKGROUND

In many fields, industrial installations are constituted by a plurality of components, such as, for example, tanks, heat exchangers, steam generators, pumps, which are connected together by pipes or tubes.

The components are arranged in buildings and are carried by vertical and/or horizontal support assemblies which are themselves fixed to the walls of the building, that is to say to the floor or the walls.

The positioning of the components relative to one another and also relative to the environment, that is to say relative to the walls of the building, is important both during installation of the components on an industrial site and during replacement of a worn component by a new component, in order that the connections between them can be made under the best conditions.

The general principles that are to be respected during replacement are that the new component must be integrated into the environment without questioning the original design, and the mechanical stresses caused by the replacement of the component must be minimised.

That is the case especially with the components of the loops of a primary circuit of a nuclear power station.

Pressurised water nuclear reactors comprise, inside a reactor building, a vessel which contains the core of the reactor and is filled with pressurised water, and a primary circuit constituted by a plurality of loops which communicate with the vessel by way of pipes. Each of the loops of the primary circuit is constituted by a plurality of components comprising, inter alia, a steam generator, in which the pressurised water is cooled and heats and vaporizes the feed water. The steam generators are arranged in areas called casemates, which are provided inside the reactor building.

Moreover, in addition to the steam generator, the casemate of each loop of the primary circuit also comprises a primary pump and the primary pipes allowing the vessel and the steam generator to be connected to the primary pump, as well as a pipe allowing the steam generator to be connected to the primary pump.

The various components of each primary loop, and more particularly the steam generator, the primary pump and the primary pipes, are connected to the walls of the building by support assemblies. The support assemblies are constituted, for example, by props or rings surrounding the component or by any other suitable member, which are fixed to the walls of the building by supports formed by plates. The supports are carried by adjustable joining members, such as, for example, tie rods.

When the building is constructed, the adjustable joining members of the supports are embedded in the walls and the floor and the positioning of each support has hitherto been carried out as follows.

First of all, a first layer of concrete, called the first-phase layer, is poured onto the walls and the floor and, when that layer has dried, the operators draw on the surfaces of the first layer check points for the positioning of the supports of each component. To that end, the operators find the coordinates of each check point in registers or on plans and determine the points on the corresponding surface with the aid of remote measuring devices, such as, for example, theodolites or tachymeters or laser scanning devices.

The operators then proceed as follows for each support.

They place the support on the corresponding joining elements and verify that the check points previously drawn on the surface of the first layer coincide with measuring points previously drawn on the support.

If the points do not correspond, the operators adjust the position of the support by adjusting each support point of the support longitudinally by means of the adjustable joining elements until the points coincide. The operators proceed in an analogous manner for each support of the component. A second layer of concrete, called the second-phase layer, is then poured at the determined location in order permanently to anchor the joining elements, and the position of the measuring points drawn on each support is verified again with the aid of the remote measuring devices.

The support assemblies are mounted on the supports and the corresponding component is then fixed to the support assemblies.

These various operations are obviously carried out for each component of each loop of the primary circuit.

This way of proceeding is long and tedious for the operators and the risks of error are not negligible owing to the large number of points to be determined and checked for each component which is associated with a plurality of supports, which means that the operators have to work for a considerable length of time in an environment which may be subjected to ionising radiation.

The coordinates of each point must be found and applied in the environment by operators, which multiplies the risks of incorrect transcription and of error.

SUMMARY OF THE INVENTION

The object of the invention is to propose a method for installing industrial components in an environment which allows these disadvantages to be remedied and the risks of error and the intervention times to be reduced significantly.

The invention accordingly relates to a method for installing industrial components in an environment, characterised in that it comprises the following steps:
  the coordinates of various points of the surfaces delimiting the environment are determined with the aid of at least one remote measuring device,
  with the aid of a computer-assisted design model representing the theoretical layout of the industrial components in the environment:
  a general installation frame of reference is defined,
  a particular frame of reference proper to a component is defined,
  measuring points for the theoretical positioning of the supports of each component are determined,
  theoretical support points for each support on joining elements with the corresponding surface of the environment are determined,
  there are codified by values:
  the coordinates of the various points of the surfaces of the environment,
  each component and each support,
  each measuring point for the theoretical positioning of the supports of each component, each theoretical support point for each support on each joining element, parameterisable model measuring ranges are parameterised by the codified values, and said at least one measuring device is controlled with the aid of the codified values by application of the corresponding range in order to compare the actual positioning points in the environment as a function of the theoretical positioning points of the supports of each component.

According to other characteristics of the invention:

the theoretical installation points of the joining elements of each support with the corresponding surface are determined, the actual positioning points of the supports of each component are determined by controlling said at least one measuring device with the aid of the codified values by application of the corresponding range of the theoretical support points, the actual installation points of each joining element on the corresponding surface are determined by controlling said at least one measuring device with the aid of the encoded values by application of the corresponding range of theoretical installation points, each actual support point of each support on each joining element is adjusted relative to the corresponding theoretical support point by taking into account the difference between the observation point and the corresponding actual support point, before each support is mounted on the corresponding surface of the environment, measuring points are drawn on said support, after mounting of each support on the corresponding surface of the environment by means of the joining elements, the actual coordinates of each measuring point of each support are determined with the aid of said at least one measuring device and those actual coordinates are compared with the codified theoretical coordinates, and said at least one remote measuring device is a device for measuring the azimuth or elevation of the points and for measuring the distance of said points, such as, for example, devices of the theodolite or tachymeter type or laser scanning devices.

The method as defined hereinbefore is applicable to the installation of the components of the loops of the primary circuits of nuclear power stations.

BRIEF SUMMARY OF THE DRAWINGS

Other characteristics and advantages of the invention will become apparent upon reading the description given hereinbelow by way of example and with reference to the accompanying drawings, in which.

DETAILED DESCRIPTION

Figure 1:
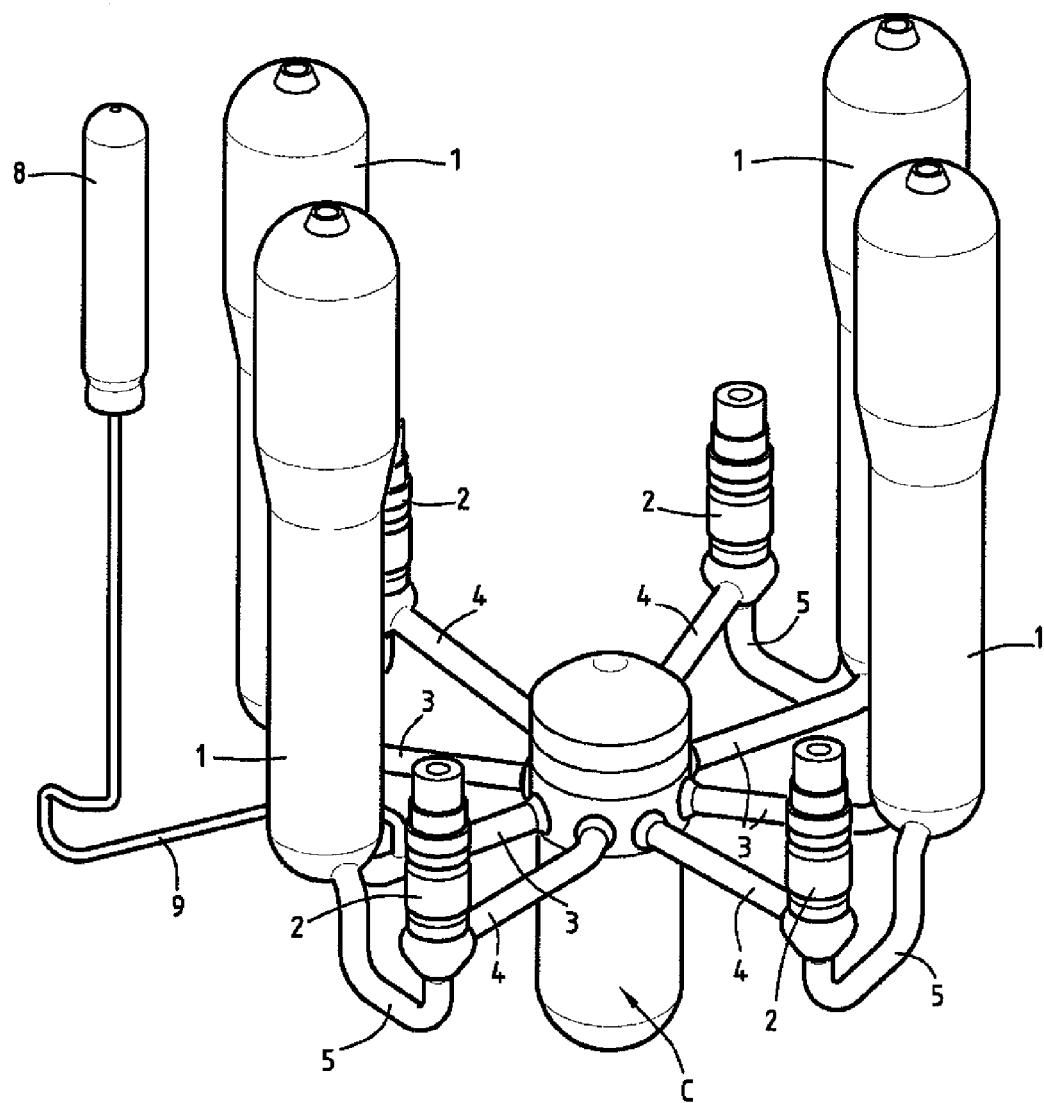
FIG. 1 is a perspective view, in diagrammatic form, of a section of a pressurised water nuclear power station.

FIG. 1 shows, in diagrammatic form, a section of a pressurised water nuclear power station which comprises a vessel C and, in this example, four loops of the primary circuit each comprising a steam generator 1, a primary pump 2 and primary pipes 3 and 4 allowing the vessel C to be connected to the steam generator 1 and to the primary pump 2, respectively, as well as a pipe 5 allowing the steam generator 1 to be connected to the primary pump 2 of the corresponding loop.

The section also comprises a pressuriser 8 which is connected by an expansion line 9 to the primary pipe 3 of a loop.

Figure 2:
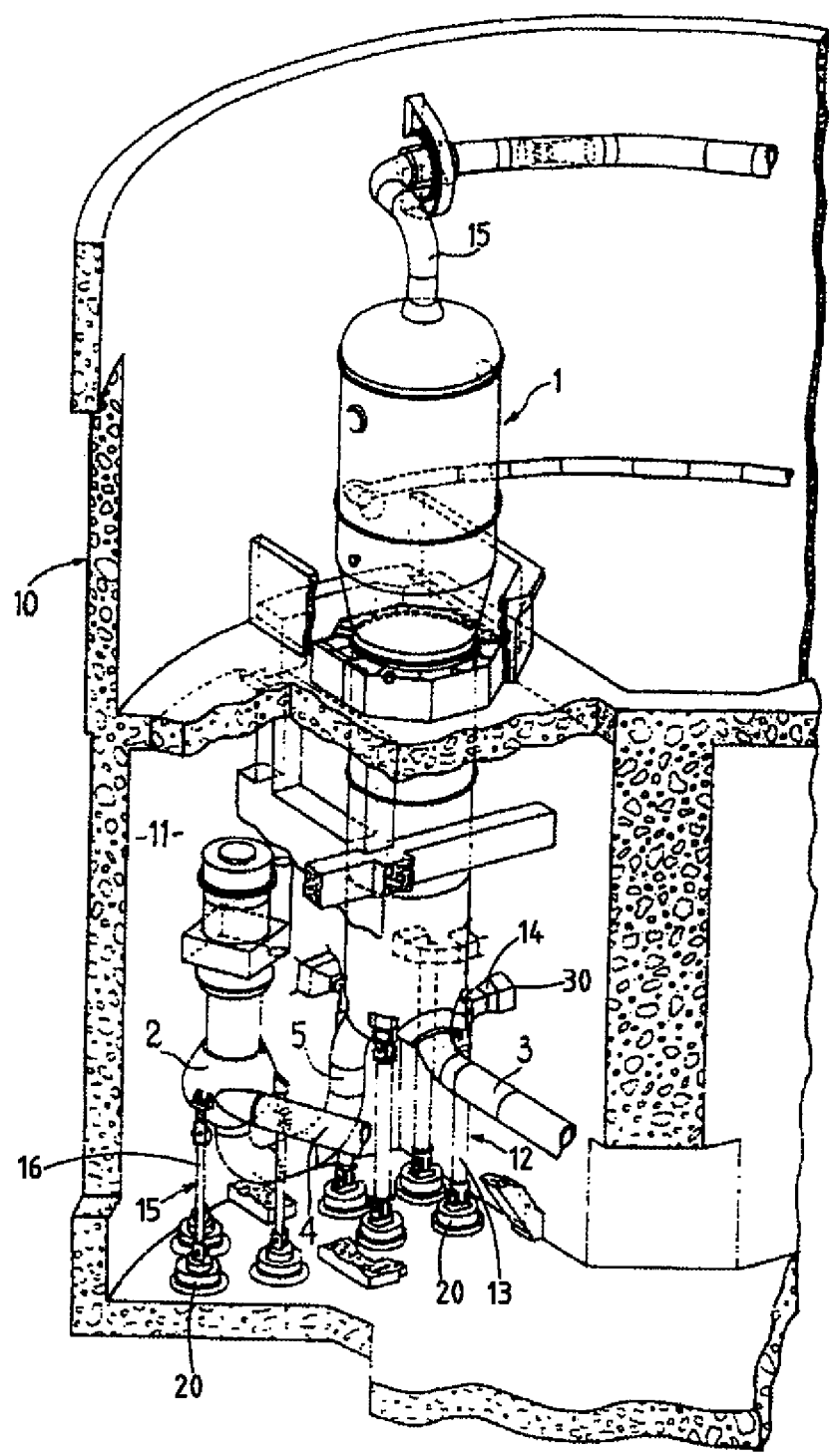
FIG. 2 is a perspective view, in diagrammatic form, of a loop of the primary circuit in its locale.

As is shown by way of example in FIG. 2, the section as a whole is arranged inside a reactor building 10 and each loop is arranged inside a locale 11, also called a casemate, provided inside the reactor building 10.

Referring now to FIG. 2, the installation of a loop in the locale 11 will now be described, the installation of the other loops being identical.

The steam generator 1 is carried by a support assembly designated generally by the reference numeral 12 and comprising, inter alia, articulated props 13, which rest on the floor of the locale 11, and lateral supports 14, which are fixed to the walls of the locale 11. The pump 2 is also carried by a support assembly 15 comprising, inter alia, articulated props 16, which likewise rest on the floor of the locale 11.

Figure 3:
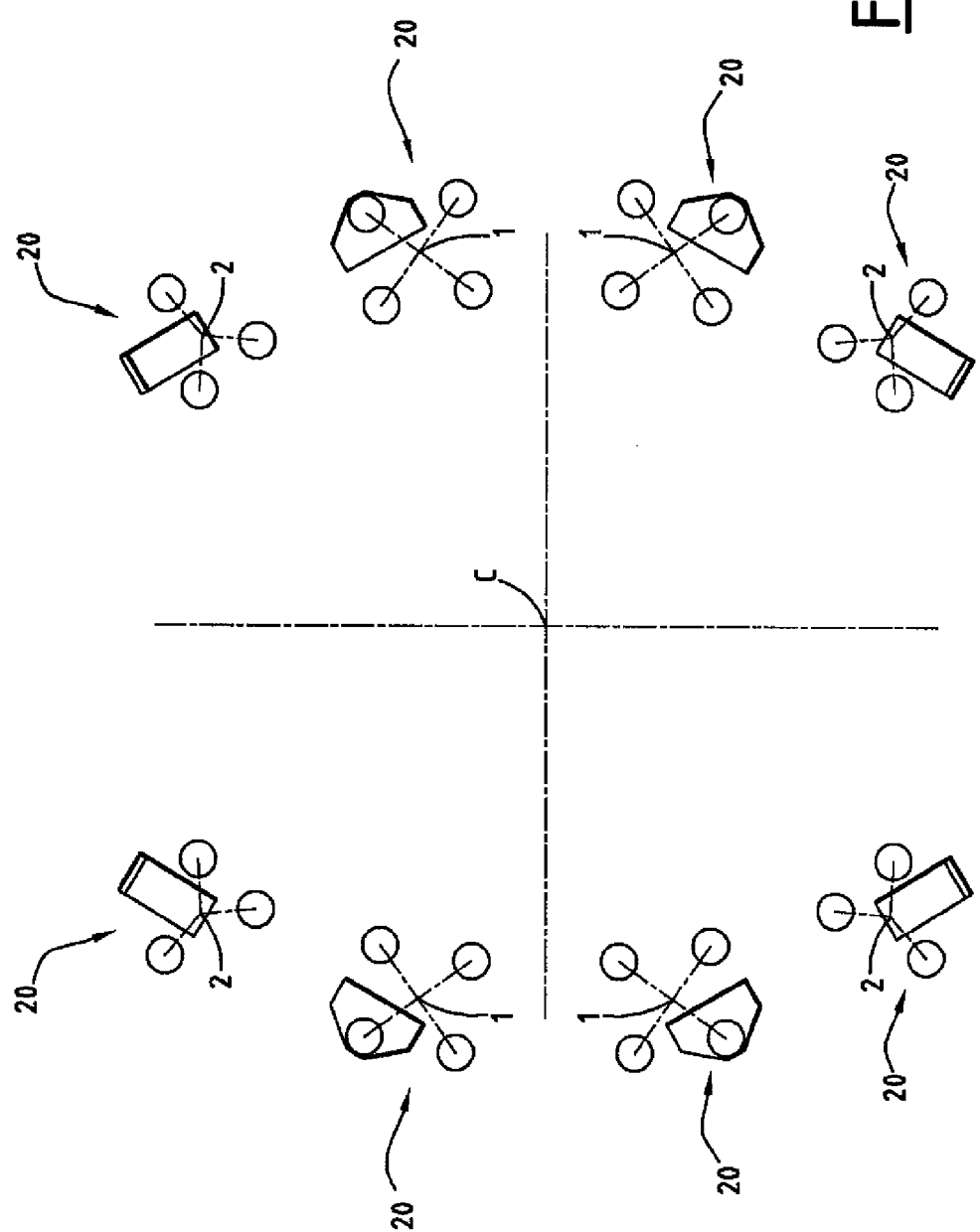
FIG. 3 is a top view, in diagrammatic form, showing an example of the layout of the horizontal supports of the components of each loop, in the case of a nuclear power station having four loops.
Figure 4:
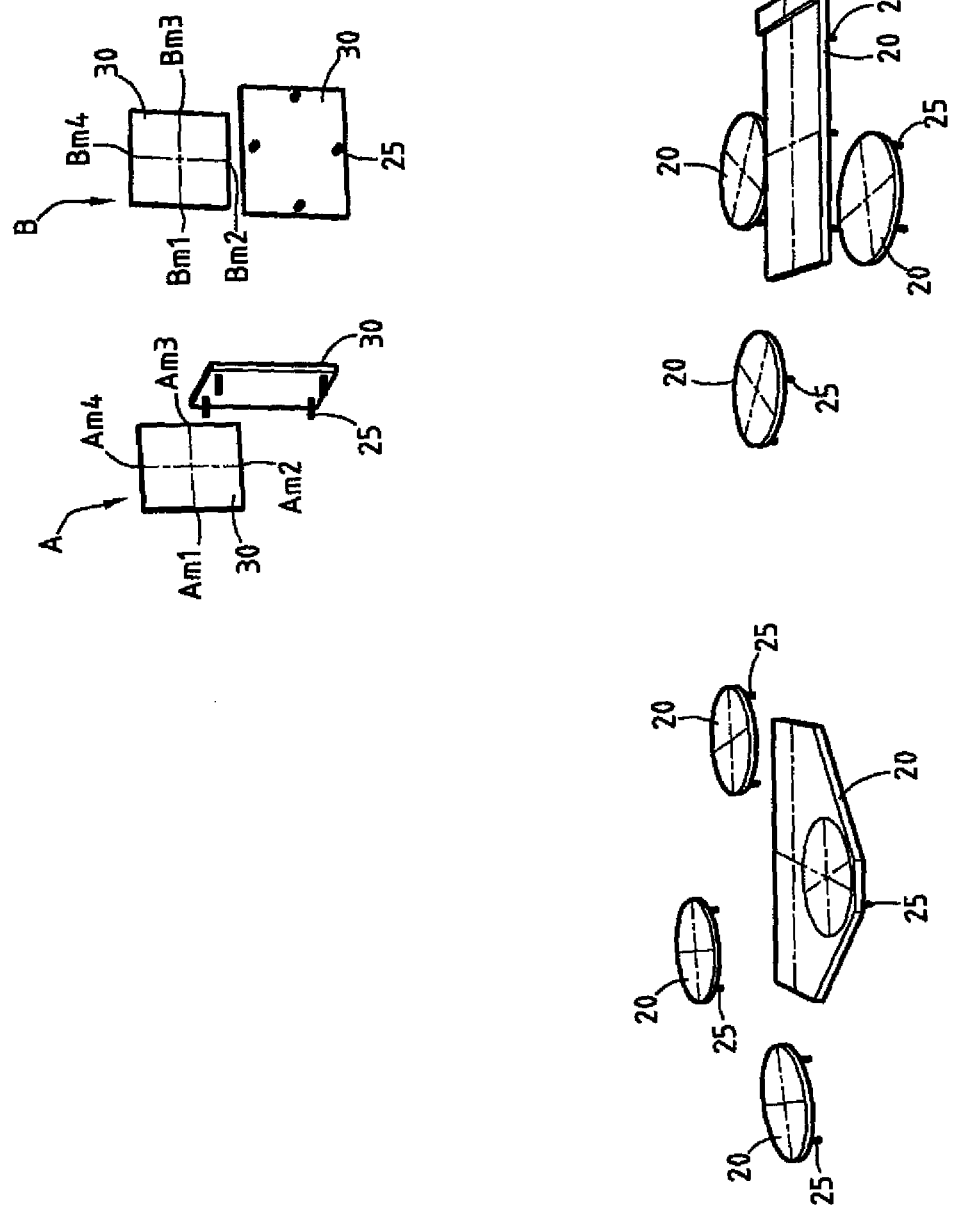
FIG. 4 is a perspective view, in diagrammatic form, showing an example of the layout of the horizontal and vertical supports of the components of a loop.

The props 13 and 16 of the steam generator 1 and of the pump 2, respectively, are fixed to the floor of the building 11 by horizontal supports 20, such as, for example, plates, and the lateral supports 14 are fixed to the walls of said locale 11 by vertical supports 30, such as, for example, plates, as is shown in FIGS. 3 and 4.

Figure 5:
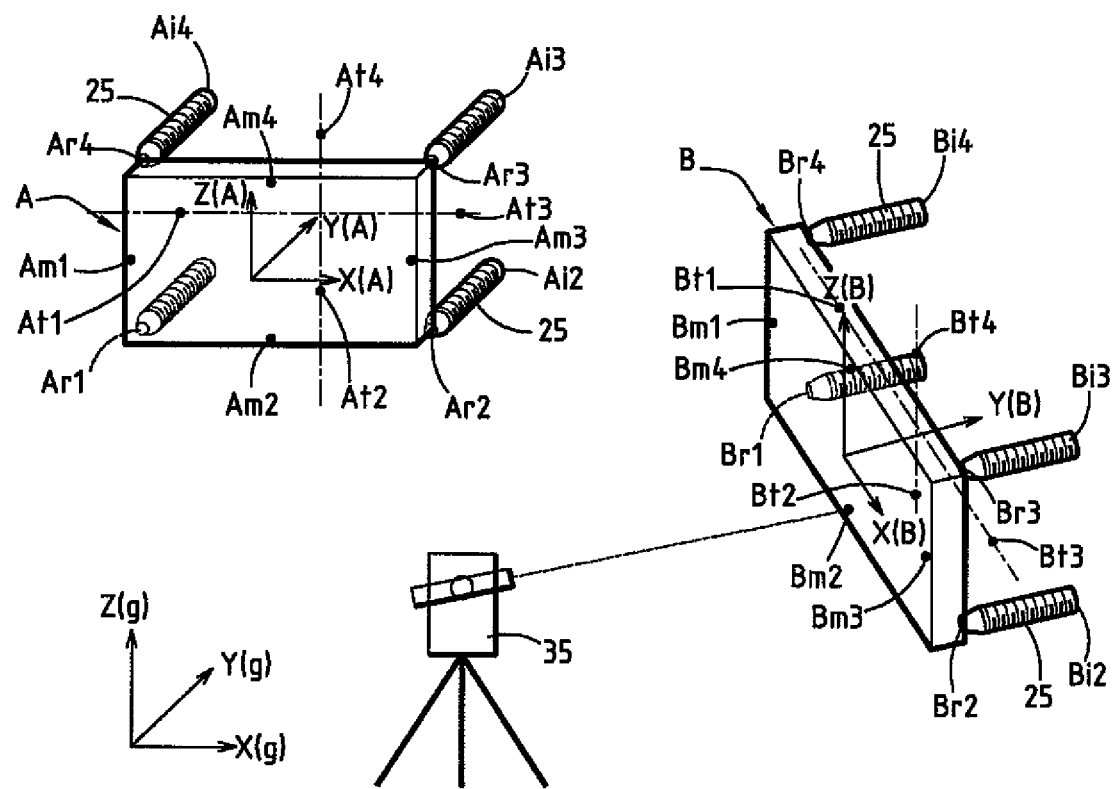
FIG. 5 is a view, in diagrammatic form, of details of two vertical supports of a component of a loop.

The components of each loop of the primary circuit are therefore associated with horizontal supports 20 and/or vertical supports 30 each bearing on a surface of the locale 11 by means of adjustable joining elements, such as, for example, mounts for anchoring tie rods 25 (FIGS. 4 and 5).

The method according to the invention for the installation of vertical supports 30, as shown in FIG. 5, will be described hereinbelow, the installation of the other horizontal supports 20 or vertical supports 30 being identical.

First of all, an operator determines, with the aid of at least one remote measuring device, the coordinates of various points of the surfaces delimiting a locale 11 in which the components of a loop of the primary circuit are to be installed. Preferably, the determinations are carried out with the aid of at least one remote measuring device.

The measuring device is a device for measuring the azimuth and elevation of the points and for measuring the distance of said points, such as, for example, devices of the theodolite or tachymeter type or laser scanning devices, of known type.

By way of example, a theodolite is a very accurate, contactless optical device for measuring vertical and horizontal angles.

The principle is the three-dimensional determination of points by optical sight and triangulation calculation. Two or more fixed devices are first oriented by adjusting beams on a number of common points, and the lattice so formed is then brought to scale.

This iterative calculation makes it possible to know the positions of the theodolites relative to one another and to obtain a "theodolite" system of reference. Then, each point to be measured, previously targeted, is aimed at by a minimum of two theodolites according to the principle of intersection. The coordinates of each point measured are then known in the system of reference linked with the devices by simple triangulation calculation.

The use of electronic theodolites, of measuring software installed on a computer and of a long-distance electronic connection between the theodolites and the computer permits the acquisition and processing of the points outside the reactor building, in real time. However, the operators must remain in the zone to be measured throughout the acquisition process, which generates considerable integrated doses for the operators and a considerable occupation time of the areas. In addition, the theodolites must be fixed to stable bases throughout the operation and at least two devices are necessary.

Another example relates to numerical photogrammetry, in which a photonumerical device with a CCD sensor is used to acquire the points. This is also so-called "contactless" measuring, and the base principle remains the three-dimensional determination of the position of points by optical sight and calculation by triangulation.

Unlike topometry with theodolites, the measuring device is not fixed and the targets are reflective. Each point is photographed according to a plurality of views and there is accordingly a "meshing" of the space by juxtaposition of the photos. After recognition or numbering of each of the points, the photos are processed by iterative calculation and the coordinates of the points are calculated by triangulation.

The use of ever larger CCD sensors, that is to say having a large number of pixels, and of optimised calculation software which can function on PC-type microcomputers allows the processing time to be optimised.

It is necessary to process several photos of the same group of points.

Unlike the method with theodolites, measurement in real time is not possible.

In order to find a function of measurement in real time during certain adjustment operations, there is used a tachymeter, which is a theodolite having a distance-meter.

By using it in fixed-base reference in the system of reference "photo", it is possible to know the position of the element in question in real time and give the adjustment values to the operators.

For identical precision, videogrammetry offers very great flexibility of use and reduces the exposure of the operators because the acquisition times are very short.

Other devices can be used, such as, for example, a laser tracker, which is a device similar to a tachymeter which carries out measurements of angle and distance and which ensures that moving targets are followed in real time. This type of device can advantageously replace the tachymeter for iterative adjustment operations.

A so-called laser scanning variant comprises an acquisition system which ensures that the environment under study is determined by carrying out a planar scan by means of a low-power laser beam reflected by a scanner mirror and the laser spot of which is observed by a CCD sensor integral with the same base.

In that case it is not necessary to target the measured elements, the system allows a very large number of points to be captured over a large variety of surfaces.

Videogrammetry will preferably be used because that technique offers flexibility of use in a very cluttered zone, and a reduced exposure time for the operators for a precision that is identical with that of theodolites.

Videogrammetry is supplemented by the use of a tachymeter, which permits measurements in real time, which are necessary for the adjustment operations and for connecting stations separated by very great distances.

Hereinbelow, for determining the various theoretical or actual points, of measurement, support, installation and checking for the supports A, B, . . . , the following codification will be used:

theoretical or actual position measuring points of the supports A, B, . . . : Am, . . . Bm, . . . , theoretical or actual support points of the supports A, B, . . . on the tie rods 25: Ar, . . . Br, . . . , theoretical or actual installation points of each tie rod 25 on the corresponding surface for the supports A, B, . . . : Ai . . . , Bi . . . , theoretical or actual check points for the supports A, B, . . . : At . . . Bt . . . .

With the aid of a computer-assisted design model representing the theoretical installation of the supports and the components in a locale 11, a number of theoretical determinations are carried out.

First of all, a general installation frame of reference $X(g)$, $Y(g)$, $Z(g)$ for a component is determined and a particular frame of reference proper to each support of each component is likewise determined.

To that end, and as shown in FIG. 5, each support 30 is codified, for example by a letter A, B, . . . . Accordingly, each particular frame of reference proper to the support A is codified $X(A)$, $Y(A)$, $Z(A)$ and to the support B is codified $X(B)$, $Y(B)$ and $Z(B)$, for each support.

Still with the aid of the computer-assisted design model, several measuring points of the theoretical positioning of the supports A and B are determined and codified Am1, Am2, Am3 and Am4 for the support A, and Bm1, Bm2, Bm3 and Bm4 for the support B.

Accordingly, four measuring points, for example, are codified for each support, those points being distributed over two axes at 90°.

Likewise, the theoretical support points of each support A and B with joining elements 25, that is to say the tie rods, are measured and codified.

For support A, four theoretical support points on the tie rods 25 are measured and codified, Ar1, Ar2, Ar3 and Ar4, and for the support B, four theoretical support points on the tie rods 25 are likewise measured and codified, Br1, Br2, Br3 and Br4.

According to a variant, still with the aid of the computer-assisted design model, the point of installation on the corresponding surface is determined and codified for each tie rod 25 of each support A and B. The points of each tie rod of the support A are codified Ai1, Ai2, Ai3 and Ai4 and of the support B are codified Bi1, Bi2, Bi3 and Bi4.

After all the measuring points have been codified, model measuring ranges are parameterised for each series of values. Those ranges are composed of a sequence of elementary calculations based on simple geometric figures, which can be used on their own or in combination with one another.

The determination of the installation of the supports of each component in its corresponding locale 11 is carried out by operators with the aid of controlled remote measuring devices 35, such as, for example, theodolites, tachymeters or laser scanning devices.

Two operating modes are possible.

In a first case, the tie rods 25 are already embedded in the corresponding wall of the locale 11 and a first layer of concrete 40 (FIG. 6), called the first-phase layer, has been poured.

In a second case, the mounts for anchoring tie rods 25 have not yet been embedded in the corresponding walls of the locale 11.

In this second case, operators determine the actual embedding points of the tie rods 25 of each support A and B by controlling the remote measuring devices with the aid of the codified values by application of the corresponding range of theoretical embedding points Ai1, Ai2, Ai3 and Ai4 for the tie rods 25 of the support A and Bi1, Bi2, Bi3 and Bi4 for the tie rods 25 of the support B.

After the actual embedding points of the tie rods 25 have been determined, the tie rods 25 are positioned and the layer of concrete 40 is poured. The layer of concrete 40 dries during a given period of time.

Figure 6:
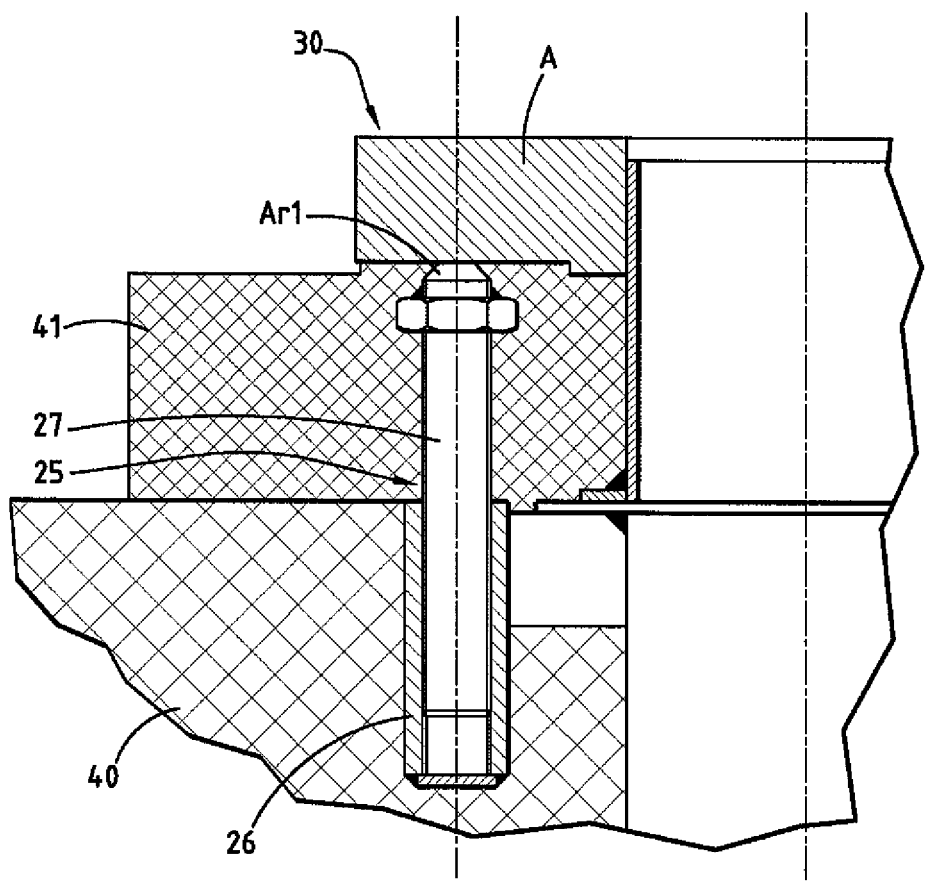
FIG. 6 is a view, in diagrammatic form and on an enlarged scale, of a joining element of a support.

As is shown in FIG. 6, each tie rod 25 comprises a nut 26 embedded in the first layer of concrete 40 and a threaded rod 27 which can be displaced longitudinally in said nut, allowing the actual support point of the corresponding support 30 on the tie rod 25 to be adjusted.

By way of example, a tie rod 25 with the actual support point Ar1 of the support A has been shown in FIG. 6.

The operators proceed as follows in order to adjust each actual support point of each support, such as, for example, the actual support point Ar1 of the support A.

First of all, an operator mounts a target of known type (not shown) on the end of the tie rod 25 to be adjusted and aims at that target with the aid of at least one measuring device. The measuring device or devices are programmed to take into account the difference in distance between the point aimed at and the actual support point due to the mounting of the target on the free end of the tie rod 25.

Accordingly, for the support point Ar1, the measuring devices are controlled and the coordinates of the theoretical support point Ar1 are applied and compared with the previously measured coordinates of the actual support point Ar1. If there is a difference between the coordinates of the actual and theoretical support point Ar1, the operator turns the threaded rod 25 of the corresponding tie rod 25 in one direction or the other in order to displace the end of the tie rod 25 longitudinally until the coordinates of the actual support point Ar1 correspond to the coordinates of the theoretical support point AU, the operator having available continuous information on the difference between the theoretical and actual coordinates of each point.

The operators proceed in an analogous manner for all the tie rods of each support 20 or 30.

At this stage, the measuring devices are controlled to draw on the surface of the first layer of concrete the actual check points of the positioning of each support.

To that end, and as shown in FIGS. 4 and 5, control of the measuring devices by application of the corresponding range to the theoretical check points previously determined by the computer-assisted design model allows the actual control points At1, At2, At3 and At4 for support A and Bt1, Bt2, Bt3 and Bt4 for support B to be determined. Then, the operators therefore draw on the surface of the first layer of concrete 40 the horizontal and vertical positioning axes for the support A and for the support B.

The operators then proceed to mount the support A on the corresponding tie rods 25 and they check the positioning thereof.

To that end, measuring points, such as, for example, dotting marks, have been drawn on the outside surface of each of the supports. Accordingly, the outside surface of the support A comprises, as is shown in FIG. 5, for example four measuring points Am1, Am2, Am3 and Am4 and the support B likewise comprises four measuring points Bm1, Bm2, Bm3 and Bm4.

Each of the supports therefore comprises four measuring points distributed on two axes at 90°.

The operators verify for support A, for example, the positioning of the measuring points Am1 and Am3 relative to the horizontal axis previously drawn and of the measuring points Am2 and Am4 relative to the vertical axis.

They also verify that the coordinates of each actual measuring point Am1 and Am3 coincide with the theoretical measuring points previously determined by the computer-assisted design model.

To that end, the measuring devices are controlled by application of the corresponding range, that is to say the range which corresponds to the theoretical measuring points Am1, Am2, Am3 and Am4 so as to compare those theoretical measuring points with the actual measuring points Am1, Am2, Am3 and Am4 drawn on the support A.

If the coordinates of the actual measuring points do not correspond with the theoretical measuring points, the operators carry out an adjustment by acting on the corresponding tie rods 25 in order to make the points correspond.

Then, a second layer of concrete 41 (FIG. 6), called the second-phase layer, is poured into the required zone and a new verification of the positioning of the points Am1, Am2, Am3 and Am4 of the support A is carried out.

A measuring report is then issued.

The operators proceed in an identical manner for each of the horizontal and/or vertical supports of the components of each loop of the primary circuit of the nuclear reactor.

After the positioning of the supports, the component corresponding to each support group can be installed in a precise manner, which facilitates connection with the other elements of the circuit.

The method according to the invention is applicable to the installation of new components of a loop of the primary circuit and likewise to the replacement of worn components of each loop by determining perfectly the refitting procedure, the modifications to be carried out on the support assemblies and the position of the connecting planes with the other components of the loop.

In general, the method according to the invention is applicable to the mounting or replacement of all the components of an industrial installation.

Finally, the method according to the invention makes it possible to reduce significantly the mounting procedures and therefore the mounting time and the time for which the operators must be present in a possible hostile environment, while also reducing the risk of errors in the positioning of the supports and of the components.

What is claimed is:

1. A method for installing industrial components in an environment comprising:
   (i) determining coordinates of various points of surfaces delimiting the environment with the aid of at least one remote measuring device;
   (ii) using a computer-assisted design model representing a theoretical layout of the industrial components in the environment to perform the steps of:
      (ii-a) defining a general installation frame of reference;
      (ii-b) defining a particular frame of reference proper to at least one of the industrial components;
      (ii-c) determining measuring points for theoretical positioning of supports of each of the industrial components; and
      (ii-d) determining theoretical support points for each support on joining elements with the corresponding surfaces of the environment;
   (iii) the coordinates of the various points of the surfaces of the environment, each of the industrial components, each of the supports, each of the measuring points for theoretical positioning of the supports of each of the industrial components and each theoretical support point for each of the supports on each joining element being codified by values;

(iv) parameterising parameterisable model measuring ranges by the codified values; and (v) controlling the at least one remote measuring device with the aid of the codified values by application of the corresponding parameterised model measuring range as a function of the measuring points for theoretical positioning of the supports of each of the industrial components;

(vi) determining actual measuring points for positioning of the supports of each component by controlling the at least one measuring device with the aid of the codified values by application of the corresponding range of the theoretical support points;

(vii) determining actual support points for each such support, the actual support points being on the joining elements;

(viii) adjusting the joining elements until the actual support points correspond with the theoretical support points; and (ix) mounting the supports on the corresponding joining elements after the actual support points correspond with the theoretical support points.

2. The method according to claim 1, further comprising determining theoretical installation points of the joining elements of each support with the corresponding surface.

3. The method according to claim 1, further comprising, before each support is mounted on the corresponding surface of the environment, drawing measuring points on the support.

4. The method according to claim 1, further comprising, after each support has been mounted on the corresponding surface of the environment by the joining elements, determining actual coordinates of each measuring point of each support with the aid of the at least one measuring device and compairing the actual coordinates with the codified theoretical coordinates.

5. The method according to claim 1, wherein the at least one remote measuring device is a device for measuring the azimuth or elevation of the points and for measuring the distance of the points.

6. The method according to claim 5, wherein the at least one remote measuring device includes at least one theodolite device, at least one tachymeter device or at least one laser scanning device.

7. The method according to claim 1, wherein the industrial components are components of loops of primary circuits of nuclear power stations.

* * * * *